United States Patent
Huang et al.

[11] Patent Number: 5,823,517
[45] Date of Patent: Oct. 20, 1998

[54] ADJUSTABLE STRUT FOR MOTOR VEHICLES

[75] Inventors: Zhen Huang, Wuppertal; Werner Busch, Weinstadt; Gunter Nagel, Esslingen, all of Germany

[73] Assignees: August Bilstein GmbH, Ennepetal; Mercedes-Benz AG, Stuttgart

[21] Appl. No.: 687,227

[22] Filed: Jul. 25, 1996

[30] Foreign Application Priority Data

Aug. 11, 1995 [DE] Germany ............ 195 29 580.3

[51] Int. Cl.[6] ............................................ B60G 17/027
[52] U.S. Cl. .................... 267/221; 267/64.16; 267/64.28
[58] Field of Search ................. 267/64.16, 64.17, 267/64.28, 221; 280/707, 714; 188/322.11, 322.16, 322.19

[56] References Cited

U.S. PATENT DOCUMENTS 5,401,053  3/1995  Sahm et al. ..................... 267/221 X Primary Examiner—Peter M. Poon
Attorney, Agent, or Firm—Max Fogiel

[57] ABSTRACT

An adjustable strut (1) for motor vehicles. It includes a dashpot that comprises a piston accommodated in a shock-absorbing cylinder (2) accommodated in a helical spring (7). The piston divides the shock-absorbing cylinder into two chambers and is attached to a rod (8). The rod extends out of the shock-absorbing cylinder through an alignment-and-sealing package at one end. The rod is articulated to the wheel mass or carriagework at one end and the shock-absorbing cylinder to the complementary component at the other end. The helical spring is secured and tensioned between two cup springs. The first cup spring (5) is attached to the shock-absorbing cylinder by two height-adjustment cylinders that surround the latter concentrically. One height-adjustment cylinder slides in and out inside the other. The second cup spring (6) is attached to the piston rod in the vicinity of its articulation to the wheel mass or carriagework.

16 Claims, 2 Drawing Sheets

ADJUSTABLE STRUT FOR MOTOR VEHICLES

BACKGROUND OF THE INVENTION

The present invention concerns an adjustable strut for motor vehicles. The strut includes a dashpot that comprises a piston accommodated in a shock-absorbing cylinder accommodated in a helical spring. The piston divides the shock-absorbing cylinder into two chambers and is attached to a rod. The rod extends out of the shock-absorbing cylinder through an alignment-and-sealing package at one end. The rod is articulated to the wheel mass or carriagework at one end and the shock-absorbing cylinder to the complementary component at the other end. The helical spring is secured and tensioned between two cup springs. The first cup spring is attached to the shock-absorbing cylinder by two height-adjustment cylinders that surround the latter concentrically. One height-adjustment cylinder slides in and out inside the other. The second cup spring is attached to the piston rod in the vicinity of its articulation to the wheel mass or carriagework. The helical spring is accordingly compressed as the piston enters the shock-absorbing cylinder, and the telescoping action of the height-adjustment cylinders dictates how far the carriagework is off the ground.

Adjustable struts of this genus are employed to control the position and level of vehicles subject to various loads or to ensure a more comfortable ride.

German AS 2 360 149 discloses a similar device. It is employed to level motor vehicles. One end of the shock-absorbing cylinder constitutes a piston that operates in conjunction with a height-adjustment cylinder. The height-adjustment cylinder is in series with a telescoping shock absorber.

The bottom of the height-adjustment cylinder attaches to the wheel mass, and the piston rod extending out of the telescoping shock absorber attaches to the carriagework. An associated spring is tensioned between one cup spring on the end of the piston rod and by another on the outer surface of the shock-absorbing cylinder.

The distance between the cup spring on the end of the piston rod and its point of articulation to the wheel mass, and accordingly between the carriagework and that point, can be increased or decreased by charging the height-adjustment cylinder with hydraulic fluid, An adjustable strut of this type, however, demands a lot of headroom, even when the carriagework is as low as it can descend. The cylinder employed in the telescoping shock absorber must be provided at a sacrifice of simplicity with an external piston and seals to ensure unexceptionable function of the motor that powers the cylinder. Such a shock-absorbing cylinder is considerably more complicated and expensive.

Another drawback of the known device is that it involves a series of two shock absorbers. The shock-absorption performance of the actual telescoping shock absorber will accordingly be superimposed over that of the hydraulically operated adjusting motor, aggravating precise regulation or preliminary adjustment of the overall shock absorption.

German OS 4 231 641 discloses a suspension system for motor vehicles. Associated with each wheel is a hydraulic assembly in series with a spring, allowing the height of the carriagework off the ground to be varied. Paralleling both the spring and the hydraulic assembly is a dashpot. This shock absorber, which must have enough of a stroke no matter what driving situation prevails, will accordingly determine, in that it is adjusted when the hydraulic assembly is adjusted, the carriagework's maximal displacement and distance off the ground.

This relatively advanced suspension system, however, also exhibits certain structurally dictated limitations in its displacement. These essentially occur in that the hydraulic assembly comprises a complete and self-contained piston-and-cylinder mechanism with many separate components that are complicated to manufacture and must be extensively machined.

SUMMARY OF THE INVENTION

The object of the present invention is accordingly an adjustable strut for motor vehicles that will demand as little headroom as possible, that will be cost-effective to manufacture, and that will have as few and inexpensive components as possible, while allowing precise and reliable positioning of the suspended areas of the vehicle and ensuring well defined regulating and adjustable shock-absorption and resilience characteristics.

The first cup spring is fastened to the outer height-adjustment cylinder. The end of the outer height-adjustment cylinder facing the piston rod is provided with mechanisms for aligning and sealing the shock-absorbing cylinder. The other end of the outer height-adjustment cylinder is provided with mechanisms for aligning and sealing the inner height-adjustment cylinder. The inner height-adjustment cylinder is fastened to the shock-absorbing cylinder and can be forced to telescope relative to the outer height-adjustment cylinder by injecting fluid into the gap between the height-adjustment cylinders and the shock-absorbing cylinder.

This design and construction allows all the mechanisms needed for varying the length of the strut to be accommodated within the inside radius of the helical spring and directly around the dashpot itself even though it demands no additional headroom. One advantage is the possibility of replacing older designs with struts in accordance with the present invention.

Another advantage is the wide range of possible adjustments in height in spite of the low headroom in that, since the outer height-adjustment cylinder surrounds the shock-absorbing cylinder and the inner height-adjustment cylinder, almost the total height of the shock-absorbing cylinder will be available for the height-adjustment cylinders to travel along. The components of the embodiment in accordance with the present invention are also essentially simpler than those of the state of the art in that it employs only easy-to-manufacture circular shock-absorbing cylinders with few changes in diameter.

The attachment of the first cup spring to the outer height-adjustment cylinder and the aforesaid arrangement of the structures that align and seal off the shock-absorbing cylinder not only simplifies assembly but ensures concentric alignment and support of the various cylinders. It will also be very simple to fasten the first cup spring to the outer height-adjustment cylinder by crimping or welding.

The approach in accordance with the present invention decreases the number of parts that slide back and forth and the number of sealing components, resulting in less friction between the separate parts.

The inner height-adjustment cylinder in one advantageous embodiment of the present invention is fastened to the end facing the outward-projecting end of the shock-absorbing cylinder. This feature eliminates the need for welding or holders on the outer surface of the shock-absorbing cylinder with their concomitant delay and induced notch actions that aggravate the manufacturing process.

Height-adjustment cylinders are usually fastened to the outward-projecting end by various plugs. The end of the inner height-adjustment cylinder that is secured tight to the shock-absorbing cylinder in one particularly advantageous embodiment is provided with a conical plug that can be attached both to the wheel mass or carriagework and to the shock-absorbing cylinder.

The result is further reduction in the number of parts needed for the strut, whereby an appropriately designed plug will be able to carry out all the sealing and securing functions demanded by the adjustment mechanisms.

The conical plug in another advantageous embodiment can be fastened to the shock-absorbing cylinder by way of a tubular connector on the end facing the outward-projecting end of the shock-absorbing cylinder. Such a tubular connector will facilitate aligning and centering the shock-absorbing cylinder in relation to the height-adjustment cylinder. The inside of the connector can simultaneously be exploited to supply fluid.

The conical plug and/or the tubular connector in one advanced version of this embodiment can accommodate the components that provide fluid for displacing the height-adjustment cylinder. This feature will eliminate the need for intakes, in the vicinity of the moving parts for instance, and further decrease wear as the result of mutual impingement.

Easy manufacture and non-problematic design, even in undesirable operating conditions, can be ensured if the components that supply the fluid for displacing the height-adjustment cylinder are accommodated axially in the conical plug and/or in the tubular connector. The fluid-supply components can be entirely eliminated from the wheel housing and can extend through the stationary areas of the carriagework.

A beneficial effect can be attained on facilitating the fabrication of components in particular if the tubular connector is part of the wall of the shock-absorbing cylinder, whereby the compartments inside are separated by a cap. There will accordingly be no need for any complicated stopper or bottom on the shock-absorbing cylinder or for any separately produced and attached tubular connector.

Another advantage of a strut in accordance with the present invention is that the areas between the end of the outer height-adjustment cylinder facing the piston rod and the cup spring next to the piston rod and/or between the opposing ends of the outer height-adjustment cylinder and the plug are accommodated in flexible protective sleeves. These sleeves reduce corrosion and atmospheric effects to practically nothing and prevent the entry of particles of dirt and other undesirable substances. They can extend more or less like bellows over the whole shock-absorbing cylinder and the critical sections of the height-adjustment cylinder. Not only the shock absorber itself, but the whole adjustment mechanism will be reliably protected.

It is of advantage and it will allow precise regulation of the adjustable strut if the height-adjustment cylinders that surround the shock-absorbing cylinder are provided with gauges to measure the displacement between the height-adjustment cylinders.

The sensors and displacement detectors can operate on various physical principles. Generally, the generator or sensor will be mounted on one height-adjustment cylinder and its complementary component on the other. Coil-and-magnet systems, capacitative systems, turbulence systems, etc. are all conceivable.

The outer surface of the shock-absorbing cylinder in one advantageous embodiment is chrome-plated. The result is a long-lasting outstanding seal between the structures that, on the ends of the outer height-adjustment cylinder, align and seal off the shock-absorbing cylinder. The same effect can be obtained by chrome-plating the outer surface of the inner height-adjustment cylinder.

It is also an advantage that the end of the inner height-adjustment cylinder facing the outward-projecting part of the piston rod rests against at least some sections of the outside circumference of the shock-absorbing cylinder. The results are not only very reliable long-term alignment of the inner height-adjustment cylinder but considerable tolerance with respect to any transverse forces that might occur. Such forces will not, due to the well-defined surface-to-surface contact ensured by the resulting support, lead to damage to the surface of the shock-absorbing cylinder or to its plating.

It is of advantage and helps to simplify manufacture of the inner height-adjustment cylinder that the end of the inner height-adjustment cylinder facing the outward-projecting part of the piston rod rests against a bearing ring inserted in the end of the height-adjustment cylinder. A separate bearing ring of the right material can reduce friction. Such a ring can be sintered out of a material that contains graphite. The ring can also be Teflon-coated.

It will be of benefit to obtaining a balance between adjustability and overall suspension behavior on the part of the vehicle for the helical spring to be a frustoconical spring with a non-linear characteristic, allowing a perceptible change in driving comfort in accordance with the adjustability.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
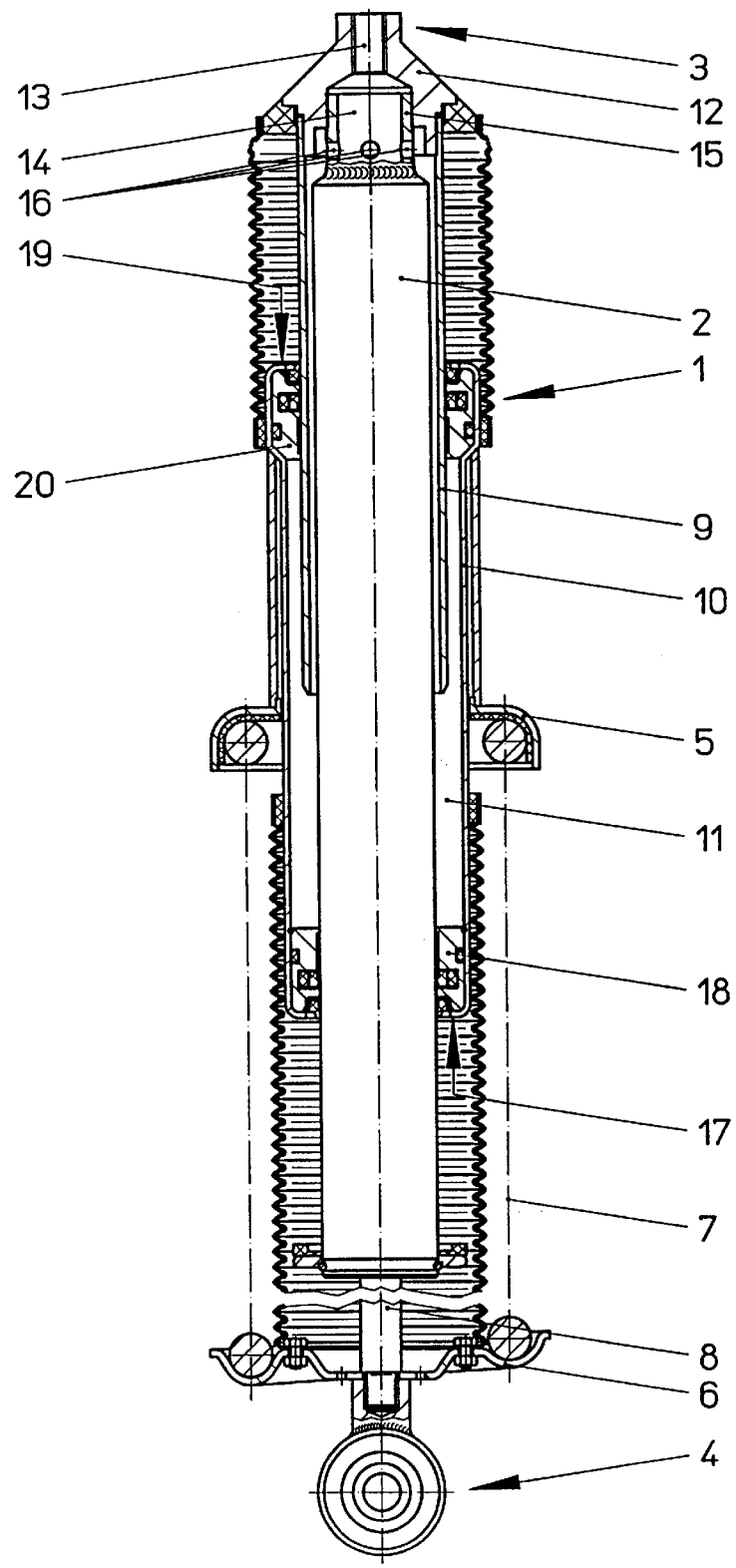
FIG. 1 illustrates a strut in accordance with the present invention with flexible protective sleeves (bellows) but with no contact between the inner height-adjustment cylinder and the outer surface of the shock-absorbing cylinder

FIG. 1 illustrates an adjustable strut 1 in accordance with the present invention. It has two bellow-type sleeves, one between each end of an outer height-adjustment cylinder and the associated end of the strut as a whole. Strut 1 includes a shock-absorbing cylinder 2, an upper point 3 of articulation, a lower point 4 of articulation, two cup springs 5 and 6, and a helical spring 7 tensioned between the cup springs.

Cup spring 6 is mounted over a piston rod 8 in the vicinity of lower point 4 of articulation. Cup spring 5 attaches to shock absorbing cylinder 2 by way of an inner height-adjustment cylinder 9 and an outer height-adjustment cylinder 10.

Inner height-adjustment cylinder 9 telescopes in and out of outer height-adjustment cylinder 10 subject to the force of a fluid injected into the space 11 between the outer surface of inner height-adjustment cylinder 9 and the inner surface of outer height-adjustment cylinder 10.

The fluid is injected through a bore 13 that extends axially through a conical plug 12 and through the inside 14 of a tubular connector 15 and vertical bores 16 accommodated therein.

The end 17 of outer height-adjustment cylinder 10 facing piston rod 8 is provided with structures 18 that align and seal off shock absorbing cylinder 2. The end 19 of outer height-adjustment cylinder 10 facing away from piston rod 8 is provided with structures 20 that align and seal off the inner height-adjustment cylinder 9.

The end of inner height-adjustment cylinder 9 facing the outward-projecting end of the shock-absorbing cylinder is fastened to the shock-absorbing cylinder by conical plug 12. Conical plug 12 also attaches inner height-adjustment cylinder 9 to the unillustrated carriagework.

Piston rod 8 is attached to the also unillustrated wheel mass at lower point 4 of articulation.

Figure 2:
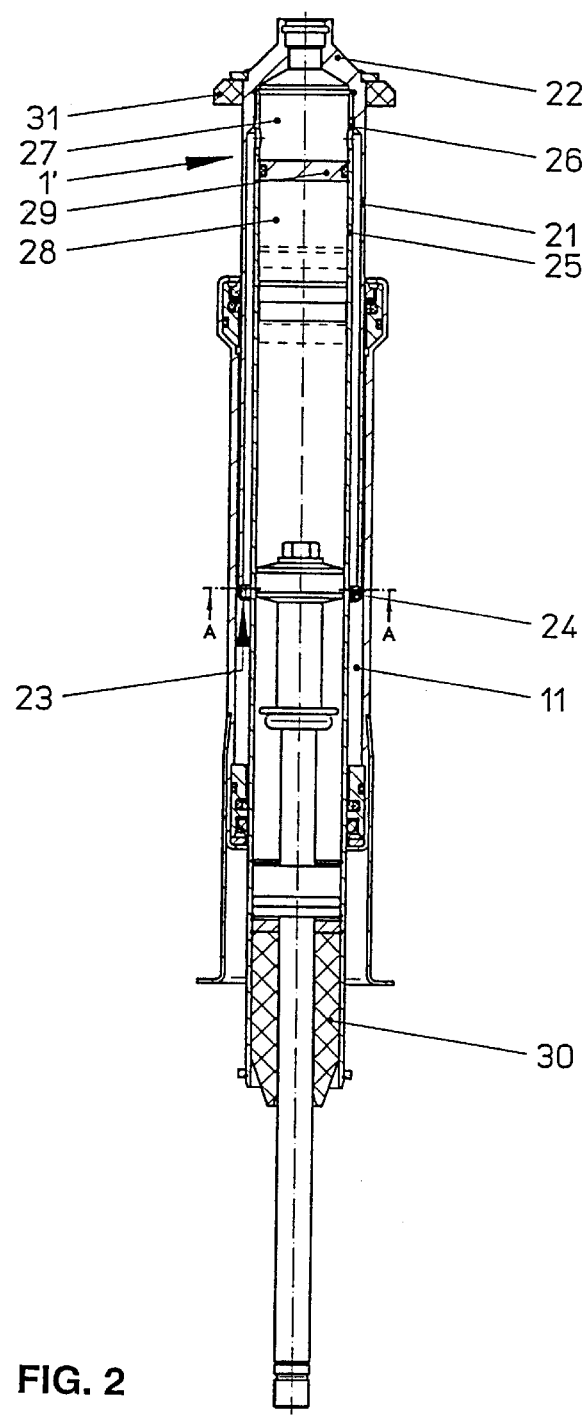
FIG. 2 illustrates a strut in accordance with the present invention wherein the inner height-adjustment cylinder is in contact with the outer surface of the shock-absorbing cylinder.
Figure 3:
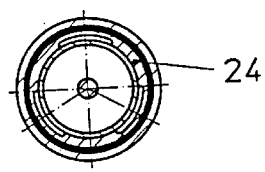
FIG. 3 is a sectional view taken along line A—A in FIG. 2.

FIG. 2 illustrates another strut 1' in accordance with the present invention. Since its inner height-adjustment cylinder 21 accommodates a conical plug 22, it includes less parts.

The end 23 of the inner height-adjustment cylinder facing the piston rod is provided with a bearing ring 24. Bearing ring 24 is represented in detail in the section along line A—A in FIG. 2. It will be evident in particular from this section that support is provided to only some of the outside circumference of the shock-absorbing cylinder, allowing the fluid unimpeded access to space 11.

Another feature of this embodiment is that tubular connector 26 is part of the outer surface of shock-absorbing cylinder 25. The space 27 inside tubular connector 26 that the fluid flows through is separated from the hydraulics compartment 28 inside the shock-absorbing cylinder by a lid 29. Lid 29 is sealed into the shock-absorbing cylinder. The helical spring, the wheel mass, and the carriagework in this embodiment will not be specified herein. Strut also incorporates resilient stops 30 and 31.

We claim:

1. An adjustable strut for motor vehicles, comprising: a dashpot having a piston in a shock-absorbing cylinder; a helical spring accommodating said shock-absorbing cylinder; said piston dividing said cylinder into two chambers; a rod attached to said piston and extending out of said cylinder through an alignment-and-sealing package at one end of said rod; said rod having one end articulated to a component of a vehicle and having another end articulated to said cylinder; first and second cup springs secured to said helical spring, said helical spring being tensioned between said cup springs; two height-adjustment cylinders surrounding said shock-absorbing cylinder concentrically, the first cup spring being attached to said shock-absorbing cylinder by said two height-adjustment cylinders, one height-adjustment cylinder sliding in and out inside the other height-adjustment cylinder; the second cup spring being attached to said rod adjacent said one end articulated to said component of said vehicle; said helical spring becoming compressed when said piston enters said shock-absorbing cylinder, said height-adjustment cylinders having a telescopic action determining how far said component is off the ground, one of said height-adjustment cylinders being an outer height-adjustment cylinder fastened to said first cup spring; said outer height-adjustment cylinder having one end facing said rod and having means for aligning and sealing said shock-absorbing cylinder, the other of said height-adjustment cylinders being an inner height-adjustment cylinder; said outer height-adjustment cylinder having another end with means for aligning and sealing said inner height-adjustment cylinder; said inner height-adjustment cylinder being fastened to said shock-absorbing cylinder and being forcible to telescope relative to said outer height-adjustment cylinder by injecting fluid into a gap between said height-adjustment cylinders and said shock-absorbing cylinder.

2. An adjustable strut for motor vehicles as defined in claim 1, wherein said inner height-adjustment cylinder is fastened to an end facing an outward-projecting end of said shock-absorbing cylinder.

3. An adjustment strut for motor vehicles as defined in claim 2, wherein said end of said inner height-adjustment cylinder is secured tight to said shock-absorbing cylinder has a conical plug attached both to said component and to said shock-absorbing cylinder.

4. An adjustable strut for motor vehicles as defined in claim 3, including a tubular connector, said conical plug being fastened to said shock-absorbing cylinder through said tubular connector on said end facing said outward-projecting end of said shock-absorbing cylinder.

5. An adjustable strut for motor vehicles as defined in claim 4, wherein said tubular connector is a part of a wall of said shock-absorbing cylinder; and a lid for separating an inside space of said tubular connector from inside said shock-absorbing cylinder.

6. An adjustable strut for motor vehicles as defined in claim 5, including means on said conical plug for supplying fluid to displace said height-adjustment cylinders.

7. An adjustable strut for motor vehicles as defined in claim 6, wherein said means for supplying said fluid to displace said height-adjustment cylinders are accommodated axially in said conical plug.

8. An adjustable strut for motor vehicles as defined in claim 6, wherein said means for supplying said fluid to displace said height-adjustment cylinders are accommodated axially in said tubular connector.

9. An adjustable strut for motor vehicles as defined in claim 5, including means on said tubular connector for supplying fluid to displace said height-adjustment cylinders.

10. An adjustable strut for motor vehicles as defined in claim 4, including a threaded connection, said conical plug being connected to said tubular connector by said threaded connection.

11. An adjustable strut for motor vehicles as defined in claim 1, including flexible protective sleeves, areas between the end of said outer height-adjustment cylinder facing said rod and said second cup spring adjacent to said rod and a plug being accommodated in said flexible protective sleeves.

12. An adjustable strut for motor vehicles as defined in claim 1, wherein height-adjustment cylinders surround said shock-absorbing cylinder and have gauges to measure displacement between said height-adjustment cylinders.

13. An adjustable strut for motor vehicles as defined in claim 1, wherein said shock-absorbing cylinder has a chrome-plated outer surface.

14. An adjustable strut for motor vehicles as defined in claim 1, wherein an end of said inner height-adjustment cylinder faces an outward-projecting part of said rod and rests against at least some sections of an outside circumference of said shock-absorbing cylinder.

15. An adjustable strut for motor vehicles as defined in claim 14, including a bearing ring inserted in said end of said inner height-adjustment cylinder facing said outward-projecting part of said rod, said end of said inner height-adjustment cylinder resting against said bearing ring.

16. An adjustable strut for motor vehicles as defined in claim 1, wherein said helical spring is a frustoconical spring with a non-linear characteristic.

* * * * *